United States Patent [19]
Ott et al.

[11] Patent Number: 5,763,771
[45] Date of Patent: Jun. 9, 1998

[54] METHOD AND ARRANGEMENT FOR DETECTING AND DOCUMENTING DAMAGE TO A CATALYTIC CONVERTER

[75] Inventors: Karl Ott, Markgröningen; Helmut Denz, Stuttgart; Ernst Wild, Oberriexingen, all of Germany

[73] Assignee: Robert Bosch GmbH, Stuttgart, Germany

[21] Appl. No.: 731,740

[22] Filed: Oct. 18, 1996

[30] Foreign Application Priority Data

Oct. 18, 1995 [DE] Germany .................. 195 38 787.2

[51] Int. Cl.$^6$ ............................................. G01M 15/00
[52] U.S. Cl. .................. 73/118.1; 60/277; 73/23.31; 73/117.3; 701/103
[58] Field of Search ............... 364/431.051, 431.062; 73/116, 117.2, 117.3, 118.1, 118.2, 23.31, 23.32; 60/277

[56] References Cited

U.S. PATENT DOCUMENTS

| | | | |
|---|---|---|---|
| 4,128,998 | 12/1978 | Hattori et al. | 60/277 |
| 4,372,155 | 2/1983 | Butler et al. | 73/23.32 |
| 5,158,059 | 10/1992 | Kuroda | 123/690 |
| 5,255,560 | 10/1993 | Klenk et al. | 73/116 |
| 5,263,453 | 11/1993 | Wakahara et al. | 123/436 |
| 5,311,138 | 5/1994 | Ott et al. | 324/503 |
| 5,317,868 | 6/1994 | Blischke et al. | 60/274 |
| 5,426,937 | 6/1995 | Ohuchi et al. | 60/276 |
| 5,437,154 | 8/1995 | Sato et al. | 60/276 |
| 5,440,922 | 8/1995 | Ichikawa | 73/117.3 |
| 5,567,873 | 10/1996 | Toyoda | 73/117.3 |

FOREIGN PATENT DOCUMENTS 02149750  6/1990  Japan .

OTHER PUBLICATIONS

"5 Series Owner's Manual", BMW Part No. 01419789737, pp. 4, 26, 66 and 93, ©1996.

*Primary Examiner*—George M. Dombroske
*Attorney, Agent, or Firm*—Walter Ottesen

[57] ABSTRACT

The invention is directed to a method for detecting and documenting damage to a catalytic converter in a motor vehicle having a fuel tank and an internal combustion engine wherein combustion misfires can occur when the level of fuel in the tank drops below a critical level. The method includes: detecting the level of fuel in the tank utilizing a fill-level sensor device; utilizing a circuit arrangement to determine when the level in the tank reaches the critical level and switching on a warning lamp to indicate that the critical level has been reached; storing a value corresponding to the critical level and the operating state of the warning lamp in a memory as a first set of data; detecting misfires of the engine and storing information as to the misfires in the memory as a second set of data; and, logically combining the first and second sets of data when the misfires are present at the same time as the critical fill level so that a determination can be made in the context of a later read out of the logically coupled data as to whether the misfires are associated with a level of the fuel corresponding to the critical level.

10 Claims, 2 Drawing Sheets

METHOD AND ARRANGEMENT FOR DETECTING AND DOCUMENTING DAMAGE TO A CATALYTIC CONVERTER

FIELD OF THE INVENTION

The invention relates to a method and an arrangement for detecting critical fill levels in the tank of a motor vehicle and especially fill levels which endanger a catalytic converter.

BACKGROUND OF THE INVENTION

In vehicles equipped with catalytic converters, a situation can occur wherein the catalytic converter can become defective by running the vehicle until the tank is completely empty. When the tank becomes empty, the fuel pump sporadically pumps vapor instead of liquid. The necessary metering of fuel to one or more cylinders of the engine of the motor vehicle can then drop so greatly that combustion misfires occur. The uncombusted fuel is then subsequently combusted together with oxygen in the catalytic converter whereby the temperature of the catalytic converter increases. The temperature increase can be so significant that the catalytic converter becomes permanently damaged.

The latest requirements and suggestions of the California Environmental Agency (CARB) require automobile manufacturers to replace a defective catalytic converter within the first 100,000 miles. Furthermore, if a specific percentage of the catalytic converters become defective during the warranty period, the California Environmental Agency requires that a recall be made. Such measures are most disadvantageous for automobile manufacturers since they are associated with considerable effort and considerable expense. Furthermore, the prestige of the manufacturer in the marketplace can become damaged.

In view of the above, automobile manufacturers have a considerable interest to be able to differentiate those defects which are caused by the product itself for technical reasons from those defects which are caused by the behavior of the driver such as impermissibly driving the vehicle until the tank is completely empty.

SUMMARY OF THE INVENTION

In view of the foregoing, it is an object of the invention to provide a method and an arrangement which make it possible to distinguish the above situations.

The method of the invention is for detecting and documenting damage to a catalytic converter in a motor vehicle having a fuel tank and an internal combustion engine wherein combustion misfires can occur when the level of fuel in the tank drops below a critical level. The method includes: detecting the level of fuel in the tank utilizing a fill-level sensor device; utilizing a circuit arrangement to determine when the level in the tank reaches the critical level and switching on a warning lamp to indicate that the critical level has been reached; storing a value corresponding to the critical level and the operating state of the warning lamp in a memory as a first set of data; detecting misfires of the engine and storing information as to the misfires in the memory as a second set of data; and, logically combining the first and second sets of data when the misfires are present at the same time as the critical fill level so that a determination can be made in the context of a later read out of the logically coupled data as to whether the misfires are associated with a level of the fuel corresponding to the critical level.

It is especially advantageous that critical fill-level values are detected by a circuit arrangement and are displayed by a warning lamp mounted so as to be easily viewable in the viewing field of the driver. The fill-level values are detected by the fill-level sensor and the warning lamp is provided, for example, with the legend "reserve with danger to catalytic converter". These critical fill-level values and the operating state of the warning lamp are then stored in a memory as memory data. It is further advantageous that misfires of the engine are detected and stored as additional memory data and that the memory data are logically coupled to the simultaneous presence of combustion misfires as well as critical fill-level values displayed by the warning lamp so that when this logically-coupled memory data is read out, a determination can be made as to whether the combustion misfires were caused by a critical fuel-level value. In this way, a catalytic converter defect caused by the driver can be detected and documented in each case. Accordingly, the continued driving notwithstanding illumination of the warning lamp (that is, when there is a drop below critical fill-level values) and simultaneously occurring combustion misfires can be documented so that damage to the catalytic converter caused in this way because of an inappropriate use of the vehicle can be shown. Furthermore, it can now be differentiated between a defect of the catalytic converter for technical reasons and a defect which was caused by the driver of the motor vehicle.

It is, for example, advantageous that the warning lamp itself is additionally monitored for defects and that information as to the operability of the warning lamp is stored together with the fill level data and the misfire data.

In this way, it is possible to determine a warning lamp defect and to document the same. When the warning lamp is defective, that is, when the lamp does not glow in the case of a fill level which is dangerous to the catalytic converter, possible damage of the catalytic converter cannot be simply ascribed to the driver when the fuel tank has been driven to empty. Advantageously, the warning lamp is therefore switched on for a short time when starting the vehicle. If the lamp does not illuminate, it must be exchanged by the driver for a lamp which is intact. If this does not happen, then a subsequent damage to the catalytic converter when driving the tank to empty can be ascribed to the driver. Stated otherwise, if a lamp does fail during operation of the vehicle, then the driver must notice the defective lamp at the latest when the vehicle is again started and replace the defective warning lamp with one that is in proper working order.

Advantageously, the combustion misfires are, for example, detected via the smooth running of the engine detected via a rpm transducer wheel, the combustion light intensity, the combustion chamber pressure, the pulsating pressure in the exhaust or a signal of an oxygen probe in the exhaust gas of the engine. In this context, it is noted that U.S. Pat. No. 5,255,560 discloses an apparatus and process for measuring the irregular running of an internal combustion engine.

The data stored in the memory can advantageously be called up later for diagnostic purposes and the memory can thereafter be erased. Accordingly, it is possible to not only detect and show that damage to the catalytic converter was caused by combustion misfires produced as a consequence of driving the vehicle on an empty tank; it is also possible to document that the driver had ignored a glowing warning lamp which indicated to the driver the possible damage to the catalytic converter and therefore had assumed the risk of damage to the catalytic converter. In this case, the damage to the catalytic converter can be attributed to the driver.

Preferably, the memory is an EEPROM which can be externally read out for diagnostic purposes.

The circuit arrangement is advantageously a component of the control apparatus of the internal combustion engine.

BRIEF DESCRIPTION OF THE DRAWINGS

The invention will now be described with reference to the drawings wherein.

DESCRIPTION OF THE PREFERRED EMBODIMENTS OF THE INVENTION

The basic idea of the present invention is to provide a method and an arrangement for detecting and documenting damage to a catalytic converter caused by critical fill-level values in the tank of a motor vehicle and having an internal combustion engine. The fill-level values documented in this manner are especially those which endanger the catalytic converter. In the context of later maintenance of the vehicle, the method and arrangement of the invention make it possible to determine whether damage to a catalytic converter is caused by a technical defect or whether the damage is caused by an omission of the driver. An additional warning lamp is provided to show the driver that the fill level of the tank has reached a level which can lead to damage of the catalytic converter. The warning lamp can, for example, be provided with the legend "reserve with danger to the catalytic converter".

Figure 2:
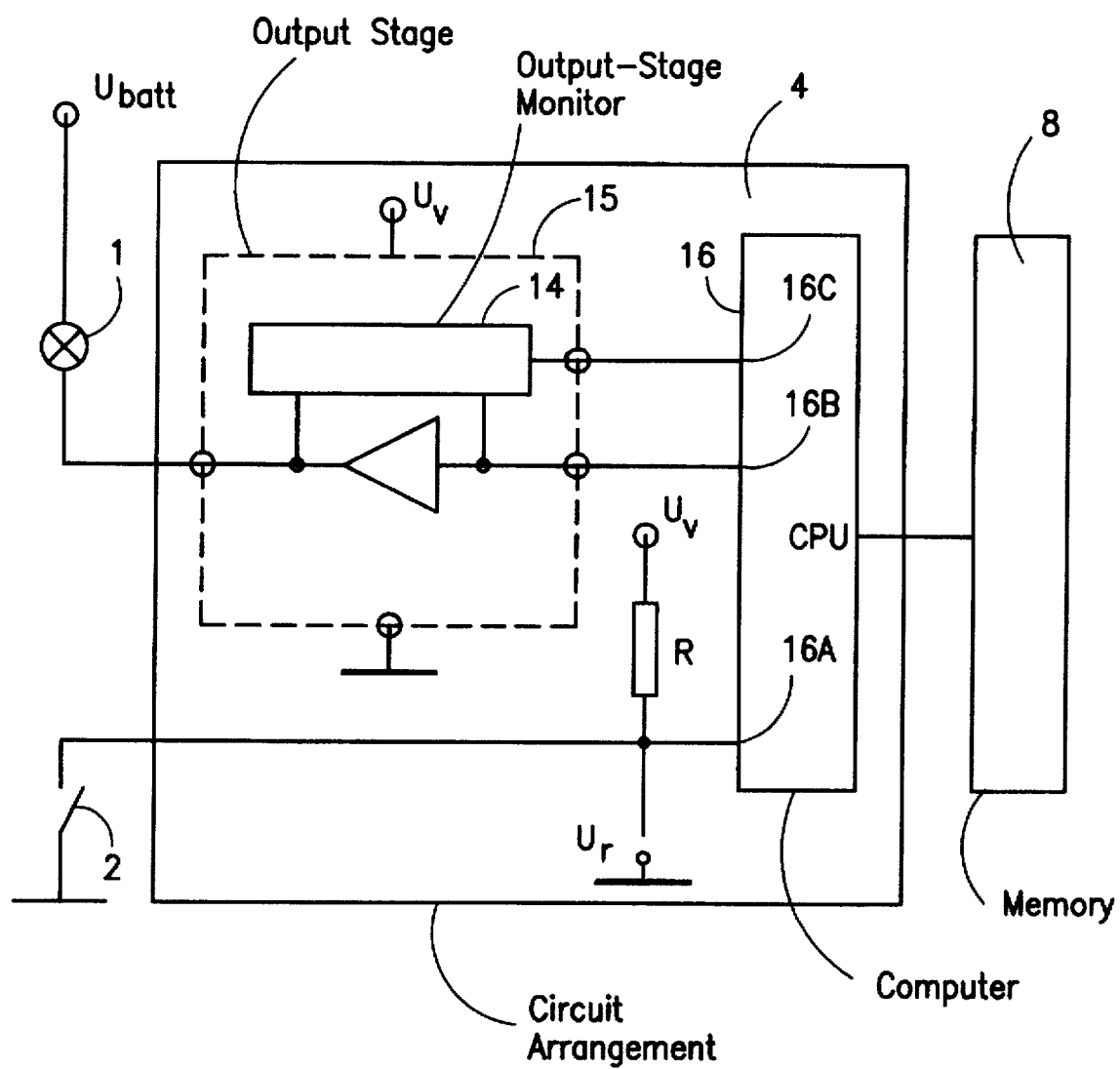

In the embodiment of FIG. 2, the information displayed to the driver, namely the operating state of the warning lamp (that is, whether this warning lamp glows or does not glow) is stored in a memory as memory data. In this way, documentation is provided that a warning lamp had been illuminated in the field of view of the driver.

Furthermore, the occurrence of combustion misfires is also stored as memory data and is documented. It is these misfires which can lead to damage of the catalytic converter. The data stored as to the simultaneous presence of combustion misfires and the critical fill-level values displayed by the warning lamp are logically combined so that a determination can be made when this logically-coupled memory information is later read out as to whether the combustion misfires are based on a critical fill-level value. In this way, by inquiring from the stored data, it can be shown that the damage to the catalytic converter was caused by an act of omission of the driver, namely, by driving the vehicle until the tank was empty.

The method for detecting and documenting damage to the catalytic converter based on critical fill-level values in the tank of a motor vehicle equipped with an internal combustion engine is further explained with reference to FIGS. 1 and 2 which show a schematic of the arrangement according to the invention.

Figure 1:
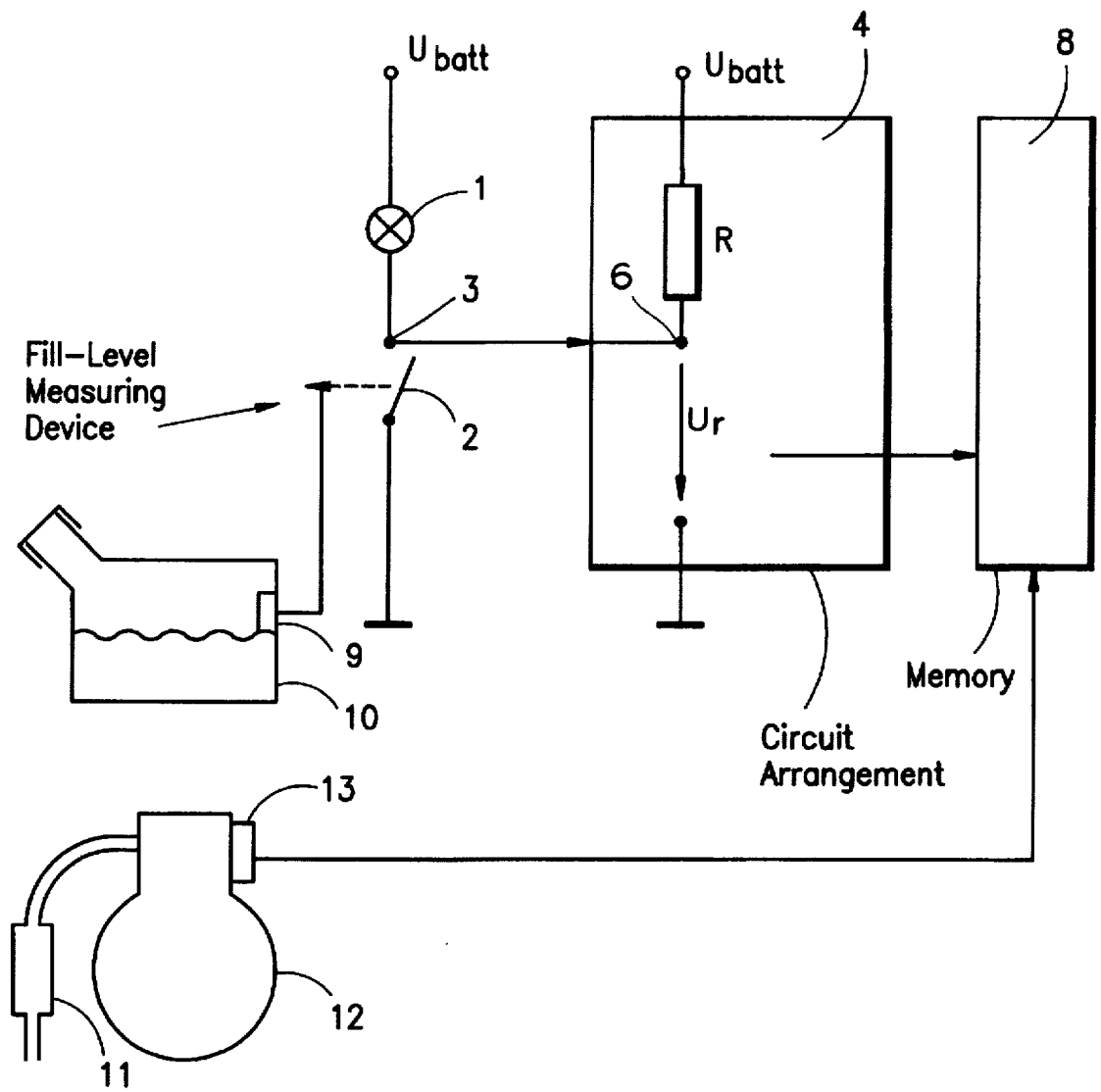
FIG. 1 shows a schematic of an arrangement for detecting and documenting damage to a catalytic converter based on critical fill levels in the tank of a motor vehicle having an internal combustion engine with the fill levels in the tank being such that they especially endanger the catalytic converter; and, FIG. 2 is a schematic showing a further embodiment of the invention wherein the operability of the warning lamp is also monitored.

As shown in FIG. 1, the arrangement includes a warning lamp 1 connected to the battery voltage $U_{batt}$ of the motor vehicle. The warning lamp 1 can be switched on and off via a switch 2. The switch 2 always closes when the fill level in the tank 10 of a motor vehicle drops below a pregiven level at which concern must be had for possible damage to the catalytic converter. The fill level is detected as known, via a fill-level measuring device 9.

The warning lamp 1 is mounted so as to be easily visible in the viewing field of the driver. The warning lamp includes the legend, for example, "reserve with danger to catalytic converter". Furthermore, the driver is advised in the owner's manual of the vehicle that an illumination of the warning lamp 1 indicates a possible damage of the catalytic converter and therefore further driving is to be avoided.

To detect critical fill-level values, a voltage lying at point 3, that is, the voltage which is applied at the warning lamp 1 is supplied to the circuit arrangement 4.

A resistor R in the circuit arrangement 4 is connected in parallel to the warning lamp 1. To detect the voltage applied to the warning lamp 1, a voltage $U_r$ is tapped between a point 6 and ground. As soon as the switch 2 is closed (that is, the warning lamp 1 is switched on and glows), the voltage $U_r$ assumes the value of 0 volts. In this operating state of the warning lamp 1, the voltage $U_r$ is supplied to a permanent memory such as an EEPROM 8 and is stored in this permanent memory as memory information. In this way, the illumination of the warning lamp 1 is recorded and documented.

At the same time, combustion misfires are detected by the circuit arrangement 4 and stored in the EEPROM 8 as additional memory information. The data information is logically coupled with the simultaneous presence of combustion misfires as well as critical fill-level values displayed by the warning lamp.

Combustion misfires can be detected in very different ways. The device 13 symbolizes, for example, the method of evaluating the smooth running via the rpm signal of the engine provided by a rpm transducer wheel as well as via the following: combustion light intensity, combustion chamber pressure, the pulsating pressure in the exhaust, or a signal of an oxygen probe in the exhaust gas of the engine or by logically coupling one or several of these variables.

If combustion misfires occur during illumination of the warning lamp 1, then these can be based on a tank which has been run to empty and can be assigned to the area of responsibility of the driver. Damage to the catalytic converter occurring in this way is then not caused by a technical defect but an act of omission of the driver. This act of omission can be determined by a later read out of the above-mentioned logically-coupled memory data and in this way, it can be clearly shown that the combustion misfires were caused by a critical fill-level value.

In an advantageous manner, the warning lamp 1 can be checked as to its operability, especially before starting the motor vehicle. One possibility for achieving this purpose is shown in FIG. 2. In contrast to FIG. 1, the warning lamp is not switched on and off directly via switch 2 coupled to the fill-level indicator. Instead, the lamp is driven via an output stage 15 which is controlled by the control apparatus computer 16 in dependence upon the switching state of the switch 2. Here too, the lamp is switched on when a fill level occurs at which the catalytic converter becomes endangered. When the tank is almost empty, switch 2 closes and the voltage $U_r$ changes from the battery voltage level $U_{batt}$ (that is, from the level of a component voltage $U_v$ adapted to the computer input 16a) to the value 0. Thereafter, the lamp I is switched on via the computer output 16b and the output stage 15.

The output stage 15 has an output stage monitor 14 with which the following can be detected: short circuits of the warning lamp current supply to ground or to the battery voltage, a cable break, or a break of the coiled filament of the lamp. Such an output stage monitor is, for example, disclosed in U.S. Pat. No. 5,311,138 which is incorporated herein by reference especially with respect to the disclosure presented therein as to the configuration of the diagnosis of the output stage. From the output stage monitor, a signal as to the operability of the warning lamp is transmitted to an input 16c of the computer and, if required, logically coupled to the fill-level data and the misfire data. Advantageously, the lamp is switched on by the computer in time-dependent association with a start of the engine or when switching on the ignition.

The driver can therefore check the operability of the warning lamp 1 when switching on the ignition. In the operator's manual for the motor vehicle, the driver is advised that the driver should replace an inoperable warning lamp 1 with an operable warning lamp because catalytic converter damage based on ignition misfires would otherwise be assigned to the driver when there is an inoperable warning lamp 1.

At the same time, the operability of the warning lamp 1 when switching on the ignition can be documented via storage in the EEPROM 8.

Furthermore, the operating state of the warning lamp 1 can be detected continuously during operation of the motor vehicle and stored.

If the warning lamp 1 becomes inoperative during operation of the vehicle, then this must be deemed to be a technical defect which should not be ascribed to the driver. For a new start of the vehicle, the driver must, however, notice the inoperability of the warning lamp 1 and replace the same with an operable warning lamp. If the driver fails to do this, then possible catalytic converter damage would likewise be ascribed to an act of omission and the costs for exchanging the catalytic converter will then be the responsibility of the driver.

Combustion misfires are recorded as well as the operating state of the warning lamp 1 and this memory data is logically coupled. In this way, a determination can be made later as to whether the combustion misfires are caused by a tank which has been run to empty and to what extent this can be ascribed to the driver or whether the misfires are caused by a technical defect. It is especially advantageous that, because of the invention, precisely that information is stored which was also available to the driver. An allegation of the driver that the warning lamp 1 had not glowed can then be checked in a simple manner.

It is therefore always possible to distinguish damage to the catalytic converter caused by the driver from such damage which was caused by a technical defect. Accordingly, unnecessary work under the guarantee or a call back can be avoided in this manner.

Finally, the circuit arrangement 4 can be in an analog, digital or hybrid configuration. It is also possible that this circuit arrangement can correspond to areas of a program-controlled digital system such as microcomputers, microprocessors, digital and analog logic circuits and the like. Furthermore, the circuit arrangement 4 can also be part of a control apparatus (not shown) of the internal combustion engine.

Furthermore, the EEPROM 8 can be part of the circuit arrangement 4 or part of the control apparatus of the engine.

It is understood that the foregoing description is that of the preferred embodiments of the invention and that various changes and modifications may be made thereto without departing from the spirit and scope of the invention as defined in the appended claims.

What is claimed is:

1. A method for detecting and documenting damage to a catalytic converter in a motor vehicle having a fuel tank and an internal combustion engine wherein combustion misfires can occur when the level of fuel in said tank drops below a critical level corresponding to an almost empty tank, the method comprising:

detecting the level of fuel in said tank utilizing a fill-level sensor device;

utilizing a circuit arrangement to determine when the level in said tank reaches said critical level and switching on a warning lamp to indicate that said critical level has been reached;

storing a value corresponding to said critical level and the operating state of said warning lamp in a memory as a first set of data;

detecting misfires of the engine and storing information as to said misfires in said memory as a second set of data when said motor vehicle is operated with the fuel remaining in said fuel tank when and after said critical level is reached; and, logically combining said first and second sets of data when said misfires are present at the same time as said critical fill level and therebelow to provide a record from which a determination can be made in the context of a later read out of said logically coupled data as to whether said misfires are associated with a level of said fuel corresponding to said critical level and therebelow thereby showing that an operator of said motor vehicle had apparently knowingly continued to operate said vehicle in the presence of said misfires after the fuel level of said fuel tank had reached said critical fuel level and dropped therebelow.

2. The method of claim 1, wherein said circuit arrangement includes a current supply circuit for said warning lamp and an output-stage diagnostic device in said current supply circuit, the method comprising the further steps of:

utilizing said circuit arrangement to detect a signal of said output-stage diagnostic device to detect a defect of said warning lamp when starting said vehicle and continuously during the operation thereof; and, storing said signal in said memory.

3. The method of claim 2, comprising the further step of:

detecting said misfires via at least one of the following variables:

(a) the smooth running of said engine detected via an rpm transducer wheel;

(b) the combustion light intensity;

(c) the pressure in the combustion chamber of said engine;

(d) the pulsating pressure in the exhaust system of said engine; and, (e) a signal of an oxygen probe mounted in the exhaust gas of the engine.

4. The method of claim 1, wherein said data stored in said memory is read out for diagnostic purposes and then erased.

5. An arrangement for detecting and documenting damage to a catalytic converter in a motor vehicle having a fuel tank and an internal combustion engine wherein combustion misfires can occur when the level of fuel in said tank drops below a critical level corresponding to an empty tank, the arrangement comprising:

a warning lamp for indicating that said critical level has been reached;

means for detecting the level of fuel in said tank and for switching on said warning lamp when said critical level is reached;

circuit means for detecting the following: data as to a value corresponding to said critical level; data as to defects of said warning lamp; and, data as to the combustion misfires when and after the fuel remaining in said fuel tank has reached and dropped below said critical level;

said circuit means including processing means for processing said data and outputting data; and, a memory for storing the data outputted by said processing means to thereby establish a record showing that an operator of said vehicle had apparently knowingly continued to operate said vehicle in the presence of said misfires after the fuel level of said fuel tank had reached said critical fuel level and dropped therebelow.

6. The arrangement of claim 5, said circuit means including a circuit for detecting a voltage ($U_r$) on said warning lamp; and, means for detecting the value of said voltage ($U_r$) before said motor vehicle is started and during the operation thereof and outputting said value of said voltage ($U_r$) for storage in said memory.

7. The arrangement of claim 5, wherein said circuit means is adapted to directly detect said value corresponding to said critical level and to drive said warning lamp and then check the operation thereof and to store data as to said check in said memory.

8. The arrangement of claim 5, said circuit means being part of the control apparatus of said internal combustion engine.

9. The arrangement of claim 5, said memory being part of said circuit means.

10. The arrangement of claim 5, wherein said memory is an EEPROM for holding data which can be read out for diagnostic purposes.

* * * * *

UNITED STATES PATENT AND TRADEMARK OFFICE
CERTIFICATE OF CORRECTION

PATENT NO. : 5,763,771
DATED : June 9, 1998
INVENTOR(S) : Karl Ott, Helmut Denz and Ernst Wild It is certified that error appears in the above-identified patent and that said Letters Patent is hereby corrected as shown below:

In column 6, line 61: between "an" and "empty", insert -- almost --.

Signed and Sealed this

Thirty-first Day of August, 1999

Attest:

Q. TODD DICKINSON

*Attesting Officer*      *Acting Commissioner of Patents and Trademarks*